United States Patent
Novack

[15] 3,679,732
[45] July 25, 1972

[54] PROCESS FOR OBTAINING 3-TRANS-DIMETHYLAMINO-4-PHENYL-4-TRANS-CARBETHOXY-$\Delta^1$-CYCLOHEXENE

[72] Inventor: Robert M. Novack, Mendham, N.J.
[73] Assignee: Warner-Lambert Company, Morris Plains, N.J.
[22] Filed: April 17, 1969
[21] Appl. No.: 817,176

[52] U.S. Cl. .........................................260/471 A, 260/999
[51] Int. Cl. ......................................................C07c 101/14
[58] Field of Search .................................260/471 R, 471 A

[56] References Cited

OTHER PUBLICATIONS

Finar, I. L., Organic Chemistry, Vo. I. (1963), pub. by Richard Clay and Co., QD251 F56, Pages 411 to 414 relied on

*Primary Examiner*—Lorraine A. Weinberger
*Assistant Examiner*—L. Arnold Thaxton
*Attorney*—Albert H. Graddis, Henry E. Millson, Jr., Frank S. Chow, Neil D. Edwards and Anne M. Kelly

[57] ABSTRACT

The separation of 3-trans-dimethylamino-4-phenyl-4-trans-carbethoxy-$\Delta^1$-cyclohexene from a mixture comprising 3-trans-dimethylamino-4-phenyl-4-trans-carbethoxy-$\Delta^1$-cyclohexene and 3-cis-dimethylamino-4-phenyl-4-cis-carbethoxy-$\Delta^1$-cyclohexene and the partial isomerization of 3-cis-dimethylamino-4-phenyl-4-cis-carbethoxy-$\Delta^1$-cyclohexene into the trans- isomer is described. In the separation procedure, the mixture containing 3-cis-dimethylamino-4-phenyl-4-cis-carbethoxy-$\Delta^1$-cyclohexene and 3-trans-dimethylamino-4-phenyl-4-trans-carbethoxy-$\Delta^1$-cyclohexene is mixed, in a suitable organic solvent, with oxalic acid or fumaric acid at a temperature up to reflux temperature until the reactants become dissolved in the solvent. When a solution is obtained, it is cooled to a temperature below about 10° C. to facilitate the precipitation of the oxalic acid or fumaric acid salt of 3-trans-dimethylamino-4-phenyl-4-trans-carbethoxy-$\Delta^1$-cyclohexene. Partial isomerization of 3-cis-dimethylamino-4-phenyl-4-cis-carbethoxy-$\Delta^1$-cyclohexene involves the step of heating the cis- isomer with an organic acid, or with an anhydride of an organic acid, at a temperature within the range of from about 60° C. to about 130° C. for a period of time sufficient to produce a mixture of the cis- and trans-isomers.

20 Claims, No Drawings

3,679,732

PROCESS FOR OBTAINING 3-TRANS-DIMETHYLAMINO-4-PHENYL-4-TRANS-CARBETHOXY-Δ-CYCLOHEXENE

BACKGROUND OF THE INVENTION

U.S. Pat. application, Ser. No. 587,673, filed Oct. 19, 1966, now abandoned discloses a mixture of 3-trans-dimethylamino-4-phenyl-4-trans-carbethoxy-$\Delta^1$-cyclohexene and 3-cis-dimethylamino-4-phenyl-4-cis-carbethoxy-$\Delta^1$-cyclohexene, a method for producing such mixtures and a process for separating the individual isomers from the mixture. In the preparative method disclosed in U.S. Pat. application, Ser. No. 587,673, the ethyl ester of atropic acid is reacted with 1-dimethylamino-butadiene-(1,3) at room temperature or at a temperature which is slightly elevated above room temperature. The product, which is thus obtained, is a mixture of the cis- and trans- isomer bases.

U.S. Pat. application, Ser. No. 587,673 describes also a process for obtaining the individual isomers from the mixture. In the procedure, the isomer bases are converted into their respective hydrochloride salts by dissolving the reaction product, i.e., the isomeric mixture, in a suitable common solvent, such as ether, and adding to the solution, thus formed a sufficient quantity of an anhydrous solution of hydrochloric acid to form a mixture of the hydrochloride salts of the cis-and trans- isomer bases. The mixture is subsequently introduced into a mixture consisting of about 10 parts by volume of ethyl acetate to one part by volume of methyl ethyl ketone. The 1.5 hydrate of the cis- isomer is less soluble in the ethyl acetate/methyl ethyl ketone mixture than the trans- isomer. Accordingly, a sufficient quantity of water is added to the mixture to form the 1.5 hydrate of the cis- isomer. The cis- isomer readily precipitates out of solution in the form of its hydrate. The trans- isomer, which remains in solution, can be recovered subsequently by the removal of the solvent.

The 3-trans-dimethylamino-4-phenyl-4-trans-carbethoxy-$\Delta^1$-cyclohexene and 3-cis-dimethylamino-4-phenyl-4-cis-carbethoxy-$\Delta^1$-cyclohexene are disclosed in U.S. Pat. application, Ser. No. 587,673 as having therapeutic activity, being useful and used as analgesics. Although both isomers have analgesic activity, the trans- isomer has been found to be somewhat more highly active than the cis- isomer. Accordingly, processes for separating the trans- isomer from a mixture containing the cis- and trans- isomers and processes for partially isomerizing the cis- isomer into the trans- isomer have become of significant importance.

BRIEF DESCRIPTION OF THE INVENTION

The present invention provides a process for separating 3-trans-dimethylamino-4-phenyl-4-trans-carbethoxy-$\Delta^1$-cyclohexene from a mixture containing 3-cis-dimethylamino-4-phenyl-4-cis-carbethoxy-$\Delta^1$-cyclohexene and 3trans-dimethylamino--phenyl-—4-trans-carbethoxy-$\Delta^1$-cyclohexene. The invention is predicated on the unexpected finding that, when a mixture containing the cis- and trans- isomers is reacted either with oxalic acid or fumaric acid while dissolved in a suitable solvent, the oxalic acid or fumaric acid salt of the trans- isomer is selectively formed and readily precipitates out of the reaction medium. In the separation procedure, oxalic acid or fumaric acid, preferably oxalic acid, and a mixture containing 3-cis-dimethylamino-4-phenyl-—4-cis-carbethoxy-$\Delta^1$-cyclohexene and 3-trans-dimethylamino-4-phenyl-4-trans-carbethoxy-$\Delta^1$-cyclohexene are admixed in a suitable solvent at a temperature ranging from room temperature to reflux temperature until the reactants become dissolved in the solvent. The solution is, thereafter, cooled, preferably to a temperature below about 10° C. to facilitate the precipitation of the acid salt of the trans- isomer. In the procedure, there is used a ratio of about 1 mol of oxalic acid or fumaric acid for each mol of 3-trans-dimethylamino-4-phenyl-4-trans-carbethoxy-$\Delta^1$-cyclohexene present in the isomeric mixture.

The partial isomerization procedure involves heating the cis- isomer at a temperature within the range of from about 60° C. to about 130° C. with an organic acid, either aliphatic or aromatic in nature, or with an anhydride of an aliphatic or aromatic organic acid. The reaction can be carried out with the reactants dissolved in a suitable organic solvent or it can be effected in the absence of a solvent for the reactants. In the partial isomerization process, a ratio of from about 2 mols to about 6 mols of acid or acid anhydride is employed for each mol of cis- base present. The optimum duration of the heating step will vary depending upon the various reaction conditions employed. In any given instance, however, the optimum heating time can be determined by preliminary experiment. The trans- isomer can be separated from the thus formed mixture of cis- and trans- isomers by the separation process described herein or by any other convenient prior art process.

DETAILED DESCRIPTION

In separating the trans- isomer from the isomeric mixture, (a) oxalic acid or fumaric acid (b) the isomeric mixture containing 3-cis-dimethylamino-4-phenyl-4-cis-carbethoxy-$\Delta^1$-cyclohexene and 3-trans-dimethylamino-4-phenyl-4-trans-carbethoxy-$\Delta^1$-cyclohexene and (c) an inert organic liquid which is a solvent for both, are charged into a suitable reaction vessel. A lower molecular weight monohydric alcohol, such as, methanol, ethanol, propanol, isopropanol, butanol, isobutanol, etc., is preferably employed as the inert organic solvent. The mixture is then stirred at a temperature within the range of from about room temperature to reflux temperature until a solution results. The period of time required to bring the reactants into solution will be influenced greatly be the reaction temperature. Generally, at elevated temperatures, a solution is obtained in a period of from about 5 minutes to about 20 minutes. At room temperature, or at temperatures elevated only slightly above about room temperature, a longer period may be required. However, when a solution has been obtained, it is cooled to a temperature below about 10° C., preferably to about 5° C., to facilitate the precipitation of the oxalic acid salt or fumaric acid salt of 3-trans-dimethylamino-4-phenyl-4-trans-carbethoxy-$\Delta^1$-cyclohexene. The salt, thus formed is recovered from the reaction system by any convenient means, for example, filtration. The cis- isomer, in the form of the free base, remains dissolved in the filtrate. Following its recovery, the acid salt of the trans- isomer is washed and dried in a conventional manner.

While completely satisfactory results are obtained when fumaric acid is used in the separation procedure, oxalic acid is employed in the preferred embodiment of the invention. It has been found that when the oxalate salt of the trans- isomer is selectively precipitated, only minimal amounts of the cis- isomer and ethyl 2-phenyl-3-dimethylmanopropionate are present.

The quantity of solvent used in this procedure, while important, is variable. Obviously, a sufficient quantity must be used to completely dissolve the isomeric mixture and oxalic acid or fumaric acid. Generally, however, there will be used from about 0.5 parts by volume to about 2.5 parts by volume, and, preferably, from about 1.0 part by volume to about 2.0 parts by volume, of solvent for each part of the combined weight of oxalic acid or fumaric acid and isomeric mixture to be dissolved therein.

In the separation procedure, a ratio from about 1.0 to about 1.2 mol of oxalic acid or fumaric acid is employed for each mol of trans- isomer present in the isomeric mixture. A greater excess of acid could be used, if desired, but the use of more than 1.2 mol of acid per mol of trans- isomer serves no useful purpose and renders the process less economical.

Thus, in the separation procedure depending upon the acid used, there is obtained 3-trans-dimethylamino-4-phenyl-4-trans-carbethoxy-$\Delta^1$-cyclohexene oxalate or 3-trans-dimethylamino-4-phenyl-4-trans-carbethoxy-$\Delta^1$-cyclohexene fumarate. These salts can be converted into the free base by conventional procedures, for example, by treatment with an alkali.

The process for the partial isomerization of the cis- isomer involves the step of heating 3-cis-dimethylamino-4-phenyl-4-cis-carbethoxy-$\Delta^1$-cyclohexene and an organic acid or anhydride of an organic acid, at a temperature within the range of from about 60° C. to about 130° C. for such a period of time as is required to convert a part of the cis- isomer to the trans- isomer. The heating step can be carried out either in the presence or absence of an inert organic solvent.

In general, any aliphatic monocarboxylic acid, aliphatic dicarboxylic acid, aromatic monocarboxylic acid or aromatic dicarboxylic acid can be used in the practice of this invention. In the alternative, an anhydride of any such acid can be used. Thus, for example, the partial rearrangement of the cis- isomer into a mixture of the cis- and trans- isomers can be accomplished by heating the cis- isomer with a saturated aliphatic mono-carboxylic acid, such as, acetic acid, etc; a saturated aliphatic dicarboxylic acid, such as, oxalic acid, succinic acid, etc; an unsaturated aliphatic monocarboxylic acid, such as, sorbic acid, etc; an unsaturated aliphatic dicarboxylic acid, such as, fumaric acid, maleic acid, itaconic acid, etc; an aromatic mono-carboxylic acid, such as, cinnamic acid, etc; or an aromatic dicarboxylic acid, such as phthalic acid, etc. Anhydrides of such acids are also suitable for use. These include, for example, acetic anhydride, succinic anhydride, maleic anhydride, cinnamic anhydride, phthalic anhydride, etc. The quantity of acid or acid anhydride used is variable within certain ranges. It has been found, however, that the most satisfactory results are achieved by maintaining a particular quantitative relationship between cis- base and organic acid or organic acid anhydride. In general, a sufficient quantity of organic acid or anhydride is employed to provide a ratio of from about 2 mols to about 6 mols of acid or anhydride for each mol of cis- base present in the reaction mixture. In the preferred embodiment of the invention, a sufficient quantity of organic acid or anhydride is used to provide a ratio of from about 2 mols to about 4 mols of acid or anhydride for each mol of cis- base present. It is to be understood that quantities of acid or acid anhydride, which are greater or lesser than those prescribed herein, can be employed to effect the partial rearrangement of the cis- isomer base. However, under ordinary circumstances, no benefit will be obtained by using a larger quantity of acid or anhydride and decreased yields of trans- isomer may result when lesser quantities of acid or anhydride are employed.

The partial isomerization process of this invention can be carried out in the presence or in the absence of an organic liquid reaction medium. In the preferred embodiment of the invention, the reaction is effected in an organic liquid in which both the cis- isomer base and the acid or acid anhydride are soluble. However, the solvent which is selected for use should be such that it does not itself interfere with the isomerization of the cis- isomer into the desired mixture of cis- and trans- isomers. While the invention is not necessarily limited thereto, it has been found that the isomerization can be effected in a completely satisfactory fashion with the cis- isomer base and acid or anhydride dissolved in a solvent, such as, isopropanol, n-butanol, 4-methyl-2-pentanol, dioxane, dimethyl formamide, etc. It is to be understood, however, that other organic liquids, which are solvents for the mixture of cis- isomer base and organic acid or anhydride, can be employed, if desired. The invention is not limited, however, to the use of an organic liquid reaction medium in which the mixture of cis- isomer base and organic acid or anhydride is soluble. Partial rearrangement of the cis- isomer base to the mixture of cis- and trans- isomer bases can be carried out in the absence of a liquid reaction medium or it can be carried out in the presence of an organic liquid reaction medium in which the cis- isomer base or the acid or anhydride, or the mixture thereof, is insoluble. Thus, for example, the process can be effected in a liquid reaction medium, such as, xylene, toluene, etc., in which either or both the cis- isomer base or the acid or anhydride is insoluble.

The length of time that the mixture of the cis- isomer base and the organic acid or organic acid anhydride is heated in the practice of this invention is variable. Since the primary objective of the process is to obtain maximum rearrangement of the cis- isomer base into the trans- isomer base in an efficient and economical manner, the heating step should be of sufficient duration to achieve that objective. In any given instance, the optimum heating period will be determined by several factors. These include, for example, the quantity and the identity of the acid or anhydride in use, the presence or the absence of an inert organic liquid reaction medium and the operating temperature. In general, however, when a mixture containing a ratio of from about 2 to 6 mols of organic acid or anhydride per mol of cis- isomer base is heated at a temperature within the range of from about 60° C. to about 130° C., either in the presence or absence of an inert organic reaction medium, partial rearrangement of the cis- isomer to the trans- isomer is achieved within a period of from about 30 minutes to about 24 hours. By preliminary experiment, using a specific quantity of a particular acid or anhydride and a definite operating temperature, one can determine the heating period which produces optimum isomerization. The isomeric mixture which is obtained by the partial isomerization process of this invention can be separated into its component compounds by the method described herein or by any prior art process. The cis- isomer which is recovered can be subjected again to partial isomerization.

The present invention, accordingly, provides a practical and commercially feasible means for separating 3-trans-dimethylamino-4-phenyl-4-trans-carbethoxy-$\Delta^1$-cyclohexene from a mixture containing that compound and 3-cis-dimethylamino-4-phenyl-4-cis-carbethoxy-$\Delta^1$-cyclohexene. It also provides a convenient means for converting the cis- isomer into a mixture comprising the cis- isomer base and a substantial proportion of 3-trans-dimethylamino-4-phenyl-4-trans-carbethoxy-$\Delta^1$-cyclohexene. It has been found that when the separation of the isomers is carried out as disclosed herein, satisfactory yields of the trans- isomer oxalate or fumarate salt are obtained. If desired or necessary, the salt can be converted into the base by any conventional means. Furthermore, when the isomerization is carried out as disclosed herein, satisfactory yields of the mixed cis- and trans- isomers are obtained. Upon separation of the mixture into its isomeric components, either by the separation method disclosed herein or by one of the prior art processes, excellent yields of the trans- isomer and obtained. The invention, accordingly, furnishes a convenient and efficient means for separating the cis- isomer from the trans- isomer and for converting the cis- isomer into the more highly active trans- isomer.

For a fuller understanding of the nature and objects of this invention, reference may be had to the following examples which are given merely as further illustrations of the invention and are not to be construed in a limiting sense.

EXAMPLE 1

A. Separation Procedure

In this example 40.2 grams (0.32 mol) of oxalic acid dihydrate, 281.0 grams of a mixture containing 3-cis-dimethylamino-4-phenyl-4-cis-carbethoxy-$\Delta^1$-cyclohexene and 3-trans-dimethylamino-4-phenyl-4-trans-carbethoxy-$\Delta^1$-cyclohexene and 460 ml of n-butyl alcohol were charged into a suitable reaction vessel. It had been determined by gas liquid chromatography that the isomeric mixture employed contained 28.1 percent, equivalent to 79.0 grams (0.29 mol), of the trans- isomer. The reaction mixture was heated to a temperature of about 82° C. and it was maintained at that temperature until a solution resulted. The heating time was about 15 minutes. The solution, thus obtained, was cooled to a temperature of about 5° C. and 3-trans-dimethylamino-4-phenyl-4-trans-carbethoxy-$\Delta^1$-cyclohexene oxalate came out of solution in the form of a precipitate. In order to insure complete precipitation of the oxalate salt of the trans- isomer, the reaction mixture was maintained at a temperature within the range of from about 0° C. to about 5° C. for a period of about 1 hour. At the end of that period, the oxalic acid salt of the trans-isomer was collected by filtration. The salt was, thereafter, washed two times using 70 ml of cold n-butyl alcohol each time. The salt was subsequently dried at a temperature of 65° C. and there was obtained 96.5 grams (0.266 mol) of 3-trans-dimethylamino-4-phenyl-4-trans-carbethoxy-$\Delta^1$-cyclohexene oxalate having a melting point at 124.5° C. to 127° C. The yield of the oxalic acid salt of the trans- isomer obtained was equivalent to 72.5 grams of 3-trans-dimethylamino-4-phenyl-4-trans-carbethoxy-$\Delta^1$-cyclohexene in the form of the free base. Thin layer chromatography indicated the presence in the product of less than about 0.1 percent of the cis- isomer and less than about 0.25 percent of ethyl 2-phenyl-3-dimethyl-aminopropionate.

B. Isomerization Procedure

The butyl alcohol filtrate, obtained when the oxalic acid salt of the trans- isomer was recovered by filtration as described in Section (A) of this example, was mixed with 378 grams (3.0 mols) of oxalic acid dihydrate and 600 ml of n-butyl alcohol. The butyl alcohol filtrate contained 208.5 grams (0.763 mol) of the cis- isomer. The mixture was heated to reflux temperature. A mixture of n-butyl alcohol and water was distilled off until the reaction mixture reached a temperature of about 110° C. The reaction mixture was then refluxed for a period of about 4 hours, following which the solvent was removed under vacuum on a steam bath. After the removal of the solvent was complete, 1.5 liters of toluene was added to the residue. Toluene was subsequently removed under vacuum on a steam bath. Following the removal of toluene, 1.5 liters of water was added to the residue and the mixture was made alkaline using 760 grams of 45 percent aqueous potassium hydroxide. The mixture of the isomeric bases was extracted into 900 ml of toluene and the toluene solution was washed with 900 ml of water. Toluene was then removed under vacuum on a steam bath. There was, thus obtained, 200.3 grams of a mixture containing 3-cis-dimethylamino-4-phenyl-4-cis-carbethoxy-$\Delta^1$-cyclohexene and 3-trans-dimethylamino-4-phenyl-4-trans-carbethoxy-$\Delta^1$-cyclohexene.

C. Separation Procedure

The isomeric mixture, produced as described in section (B) of this example was admixed with 65.4 grams (0.513 mol) of oxalic acid dihydrate and 610 ml of n-butyl alcohol. The mixture was, thereafter, heated to a temperature of about 85° C. and it was maintained at that temperature until a solution resulted. This occurred after heating for a period of about 15 minutes. The solution was cooled to a temperature of about 5° C. and it was maintained at a temperature within the range of from about 0° C. to 5° C. for a period of 1 hour. The oxalic acid salt of 3-trans-dimethylamino-4-phenyl-4-trans-carbethoxy-$\Delta^1$-cyclohexene which precipitated from the solution was collected by filtration and it was washed two times using 70 ml portions of cold n-butyl alcohol each time. The salt was then dried at a temperature of 65° C. There was, thus obtained, 148.0 grams of 3-trans-dimethylamino-4-phenyl-4-trans-carbethoxy-$\Delta^1$-cyclohexene oxalate. The yield of the oxalic acid salt was equivalent to 111.5 grams of 3-trans-dimethylamino-4-phenyl-4-trans-carbethoxy-$\Delta^1$-cyclohexene in the form of the free base. Thin layer chromatography indicated that the product, i.e., the oxalic acid salt of the trans-isomer, contained less than 0.1 percent of the cis- isomer and less than 0.25 percent of ethyl 2-phenyl-3-dimethylaminopropionate.

D. Additional Isomerizations and Separations

The n-butyl alcohol filtrate, obtained as described in Section (C) of this example when the precipitated oxalic acid salt of the trans- isomer was recovered by filtration, was subjected to the partial isomerization process described herein, and the oxalic acid salt of the trans- base was separated from the isomeric mixture thus obtained. This sequence was repeated starting with the n-butyl alcohol filtrate of the separation procedure. There was obtained in the first instance 40.8 grams and in the second 11.5 grams of the oxalic acid salt of 3-trans-dimethylamino-4-phenyl-4-trans-carbethoxy-$\Delta^1$-cyclohexene, the purity of which was comparable to that of the trans-isomer obtained in the initial stages of the process. The additional yield of oxalic acid salt is equivalent to 39.4 grams of 3-trans-dimethylamino-4-phenyl-4-trans-carbethoxy-$\Delta^1$-cyclohexene in the form of the free base.

The total yield of oxalic acid salt of the trans- isomer produced in the process was equivalent to a yield of 150.9 grams (72.5 percent of theory) of the trans- isomer in the form of the free base.

EXAMPLE 2

In this example, the trans- isomer was isolated from a mixture containing 3-cis-dimethylamino-4-phenyl-4-cis-carbethoxy-$\Delta^1$-cyclohexene and 3-trans-dimethylamino-4-phenyl-4-trans-carbethoxy-$\Delta^1$-cyclohexene.

Thus, 0.58 grams (0.005 mol) of fumaric acid, 3.9 grams of a mixture of 3-cis-dimethylamino-4-phenyl-4-cis-carbethoxy-$\Delta^1$-cyclohexene and 3-trans-dimethylamino-4-phenyl-4-trans-carbethoxy-$\Delta^1$-cyclohexene and 5 ml of isopropyl alcohol were charged into a suitable vessel. It had been determined by gas liquid chromatography that the isomer mixture used contained 1.09 grams (0.004 mol) of the trans- base. The mixture was heated to reflux and when, after about 15 minutes, the reactants were dissolved in the alcohol, the solution was cooled to a temperature of about 5° C. On cooling, the formation of a precipitate was observed. A temperature of about 5° C. was maintained until precipitation was complete. When precipitation was complete, 20 ml of ether were added to the mixture and the precipitate, i.e., 3-trans-dimethylamino-4-phenyl-trans-carbethoxy-$\Delta^1$-cyclohexene fumarate, was collected by filtration. The fumaric acid salt of the trans- isomer was washed with isopropyl alcohol and dried at a temperature within the range of from about 55° C. to about 65° C. There was, thus obtained, 1.25 grams of the fumaric acid salt of 3-trans-dimethylamino-4-phenyl-4-trans-carbethoxy-$\Delta^1$-cyclohexene having a melting point at 120° C. to 122° C. The yield of the fumaric acid salt was equivalent to a yield of 0.88 grams (81 percent of theory) of the trans- isomer. By thin layer chromatography, it was found that the product contained 1 percent to 2 percent of the cis- isomer and 1 percent of ethyl 2-phenyl-3-dimethylaminopropionate.

EXAMPLE 3

In this example, 3-cis-dimethylamino-4-phenyl-4-cis-carbethoxy-$\Delta^1$-cyclohexene was subjected to the partial isomerization process to yield a mixture containing the said cis-isomer and 3-trans-dimethylamino-4-phenyl-4-trans-carbethoxy-$\Delta^1$-cyclohexene.

In the process, 2.73 grams (0.01 mol) of 3-cis-dimethylamino-4-phenyl-4-cis-carbethoxy-$\Delta^1$-cyclohexene, 3.48 grams (0.03 mol) of fumaric acid and 15 ml of n-butyl alcohol were charged into a suitable vessel and heated at reflux for a period of about 2½ hours. At the end of that period of time, the n-butyl alcohol was removed under vacuum on a steam bath and the residue was suspended in water. The suspension was then made alkaline using 50 percent aqueous sodium hydroxide and the product, i.e., a mixture of 3-cis-dimethylamino-4-phenyl-4-cis-carbethoxy-$\Delta^1$-cyclohexene and 3-trans-dimethylamino-4-phenyl-4-trans-carbethoxy-$\Delta^1$cyclohexene was extracted into ether. The ether extract was, thereafter, washed with water, dried with magnesium sulfate, filtered and the filtrate was concentrated to yield a residue of 2.68 grams (98.2 percent) containing the mixed isomeric bases. By gas liquid chromatography, it was determined that the product contained 41.4 percent of the trans-isomer, 39 percent of the cis- isomer and 15.1 percent of ethyl 2-phenyl-3-dimethylaminopropionate.

EXAMPLE 4

This example demonstrates the use of o-phthalic acid to bring about the partial isomerization of 3-cis-dimethylamino-4-phenyl44-cis-carbethoxy-$\Delta^1$-cyclohexene into a mixture containing the cis- isomer in combination with the trans- isomer.

In the process, 13.65 grams (0.05 mol) of 3-cis-dimethylamino-4-phenyl-4cis-carbethoxy-$\Delta^1$-cyclohexene, 24.9 grams (0.15 mol) of o-phthalic acid and 75 cc. of n-butyl alcohol were charged into a suitable vessel and the mixture was heated at reflux for a period of about 4 hours. At the end of that period of time, n-butyl alcohol was removed under vacuum on a steam bath and the residue which remained was suspended in water. The suspension was then made alkaline using 50 percent aqueous sodium hydroxide and the mixture of 3-cis-dimethylamino-4-phenyl-4-cis-carbethoxy-$\Delta^1$-cyclohexene and 3-trans-dimethylamino-4-phenyl-4-trans-carbethoxy-$\Delta^1$-cyclohexene was extracted into ether. The ethereal solution was itself extracted with 1 N hydrochloric acid and the aqueous acid extract was made alkaline and extracted with ether. The ether extract was dried with magnesium sulfate and filtered and the filtrate was concentrated to a residue of 9.75 grams (71.3 percent of theory) containing a mixture of 3-cis-dimethylamino-4-phenyl-4-cis-carbethoxy-$\Delta^1$-cyclohexene and 3-trans-dimethylamino-4-phenyl-4-trans-carbethoxy-$\Delta^1$-cyclohexene. It was determined by gas liquid chromatography that the product contained 50.2 percent of the trans- isomer, 43.3 percent of the cis- isomer and 0.3 percent of ethyl 2-phenyl-3-dimethylaminopropionate.

EXAMPLE 5

This example is included to demonstrate the partial isomerization of 3-cis-dimethylamino-4-phenyl-4-cis-carbethoxy-$\Delta^1$-cyclohexene using acetic acid.

In this example, 13.65 grams (0.05 mol) of 3-cis-dimethylamino-4-phenyl-4-cis-carbethoxy-$\Delta^1$-cyclohexene, 40 ml of acetic acid and 40 ml of water were charged into a suitable vessel and heated at reflux for a period of about 2 hours. At the end of that period of time, the aqueous suspension was made alkaline using 50 percent sodium hydroxide and the product, i.e., 3-cis-dimethylamino-4-phenyl-4-cis-carbethoxy-$\Delta^1$-cyclohexene and 3-trans-dimethylamino-4-trans-carbethoxy-$\Delta^1$-cyclohexene was extracted into ether. The ether extract was then extracted using 1 N hydrochloric acid. The aqueous acid extract was made alkaline and extracted with ether. The ether extract was dried with magnesium sulfate, filtered and concentrated to a residue of 11.2 grams comprising a mixture of 3-cis-dimethylamino-4-phenyl-4-cis-carbethoxy-$\Delta^1$-cyclohexene and 3-trans-dimethylamino-4-phenyl-4-trans-carbethoxy-$\Delta^1$-cyclohexene.

The residue, obtained as described in the preceding paragraph, was charged into a vessel with 3.65 grams (0.03 mol) of oxalic acid dihydrate and 50 ml of isopropyl alcohol. The mixture, thus obtained, was heated at a temperature of 75° C. until a solution resulted. The solution was immediately cooled to a temperature of 5° C. and the oxalic acid salt of 3-trans-dimethylamino-4-phenyl-4-trans-carbethoxy-$\Delta^1$-cyclohexene came out of solution in the form of a precipitate. By filtration, and after drying, 9.85 grams of the trans- oxalate salt was obtained. This yield of oxalic acid salt of the trans- isomer is equivalent to a yield of 7.4 grams (54.2 percent of theory) of the trans- isomer in the form of the free base.

EXAMPLE 6

This example is included herein to demonstrate the use of itaconic acid in the isomerization of 3-cis-dimethylamino-4-phenyl-4-cis-carbethoxy-$\Delta^1$cyclohexene.

In the process, 13.65 grams (0.05 mol) of 3-cis-dimethylamino-4-phenyl-4-cis-carbethoxy-$\Delta^1$-cyclohexene, 19.5 grams of (0.15 mol) of itaconic acid and 75 ml of n-butyl alcohol were charged into a suitable vessel and the mixture was heated at reflux for a period of about 4½ hours. At the end of that period of time, n-butyl alcohol was removed under vacuum on a steam bath and the residue was suspended in water. The suspension was made alkaline using 50 percent aqueous sodium hydroxide and the isomeric mixture was extracted into ether. The ethereal solution was then extracted with 1 N hydrochloric acid, following which the aqueous acid extract was made alkaline. The alkaline extract was extracted with ether and the ether solution was subsequently dried with magnesium sulfate, filtered and concentrated to a residue of 7.73 grams.

The residue, obtained as described in the preceding paragraph, comprising a mixture of 3-cis-dimethylamino-4-phenyl-4-cis-carbethoxy-$\Delta^1$-cyclohexene and 3-trans-dimethylamino-4-phenyl-4-trans-carbethoxy-$\Delta^1$-cyclohexene was charged into a vessel containing 3.7 grams (0.01 mol) of naphthalene-1,5-disulfonic acid, 4⅓ hydrate, and 34 ml of isopropyl alcohol. The mixture was heated at a temperature of 75° C. until a solution resulted. The solution, thus obtained, was cooled to a temperature of 5° C. and the naphthalene-1,5-disulfonic acid salt of 3-trans-dimethylamino-4-phenyl-4-trans-carbethoxy-$\Delta^1$-cyclohexene came out in the form of a precipitate. Upon filtration, there was obtained 2.95 grams of the trans-disulfonate salt, equivalent to a yield of 1.92 grams (14.0 percent) of the trans- isomer in the form of free base.

EXAMPLE 7

This example is included to demonstrate the use of malonic acid in the partial isomerization of 3-cis-dimethylamino-4-phenyl-4-cis-carbethoxy-$\Delta^1$-cyclohexene.

In the process, 13.65 grams (0.05 mol) of 3-cis-dimethylamino-4-phenyl-4-cis-carbethoxy-$\Delta^1$-cyclohexene, 20.7 grams (0.20 mol) of malonic acid and 75 ml of n-butyl alcohol were charged into a suitable vessel and the mixture was heated at reflux temperature for a period of about 4 hours. The reaction mixture was worked up as described in Example 6, to yield a residue of 8.65 grams containing a mixture of 3-cis-dimethylamino-4-phenyl-4-cis-carbethoxy-$\Delta^1$cyclohexene and 3-trans-dimethylamino-4-phenyl-4-trans-carbethoxy-$\Delta^1$-cyclohexene.

The residue, obtained as described in the preceding paragraph, was treated with naphthalene-1,5-disulfonic acid, 4⅓ hydrate, as described in Example 6, to produce 2,72 grams of the naphthalene-1,5-disulfonic acid salt of the trans- isomer. This yield of the disulfonate salt is equivalent to a yield of 1.77 grams (13 percent) of the trans- isomer in the form of the free base.

EXAMPLE 8

This example is included herein to demonstrate the use of maleic acid in the partial isomerization of 3-cis-dimethylamino-4-phenyl-4-cis-carbethoxy-$\Delta^1$-cyclohexene.

In the process, 13.65 grams (0.05 mol) of 3-cis-dimethylamino-4-phenyl-4-cis-carbethoxy-$\Delta^1$-cyclohexene, 17.4 grams (0.15 mol) of maleic acid and 75 ml of dioxane were charged into a suitable vessel and the mixture was heated at reflux temperature for a period of about 4½ hours. The reaction mixture was worked up as described in Example 6, to yield a residue of 11.8 grams comprising a mixture of 3-cis-dimethylamino-4-phenyl-4-cis-carbethoxy-$\Delta^1$-cyclohexene and 3-trans-dimethylamino-4-phenyl-4-trans-carbethoxy-$\Delta^1$-cyclohexene. By gas liquid chromatography, it was determined that the mixture contained 52.8 percent of the trans- isomer and 46.8 percent of the cis- isomer.

EXAMPLE 9

This example is included herein to demonstrate the partial isomerization of 3-cis-dimethylamino-4-phenyl-4-cis-carbethoxy-$\Delta^1$-cyclohexene using maleic acid with the reaction being carried out in dimethylformamide.

In the process, 13.65 grams (0.05 mol) of 3-cis-dimethylamino-4-phenyl-4-cis-carbethoxy-$\Delta^1$-cyclohexene, 17.4 grams (0.15 mol) of maleic acid and 75 ml of dimethylformamide were charged into a suitable vessel and the mixture was heated at a temperature of about 120° C. for a period of about 2½ hours. The reaction mixture was worked up as described in Example 6, and there was obtained, a residue of 9.77 grams comprising a mixture of 3-cis-dimethylamino-4-phenyl-4-cis-carbethoxy-Δ-cyclohexene and 3-trans-dimethylamino-4-phenyl-4-trans-carbethoxy-Δ¹-cyclohexene.

The residue, produced as described in the preceding paragraph, was treated with naphthalene-1,5-disulfonic acid, 4⅓ hydrate as described in Example 6, and there was obtained 8.9 grams of the naphthalene-1,5-disulfonic acid salt of 3-trans-dimethylamino-4-phenyl-4-trans-carbethoxy-Δ¹-cyclohexene. This yield of the trans-disulfonate salt is equivalent to a yield of 5.8 grams (42.5 percent) of the trans- isomer in the form of the free base.

Having described my invention, what I desire to secure by Letters Patent is:

1. A process for separating 3-trans-dimethylamino-4-phenyl-4-trans-carbethoxy-Δ¹-cyclohexene from an isomeric mixture comprising 3-trans-dimethylamino-4-phenyl-4-trans-carbethoxy-Δ¹-cyclohexene and 3cis-dimethylamino-4-phenyl-4 cis-carbethoxy-Δ¹-cyclohexene which comprises the steps of (1) treating said isomeric mixture with oxalic said or fumaric acid, in an inert organic liquid which is a solvent for said isomeric mixture and said acid, at a temperature up to reflux temperature for a period of time sufficient to dissolve said isomeric mixture and said acid in said solvent, there being used a ratio of from about 1.0 to about 1.2 mol of said acid for each mol of said 3-trans-dimethylamino-4-phenyl-4-trans-carbethoxy-Δ¹-cyclohexene present in said isomeric mixture and (2) recovering the acid salt of 3-trans-dimethylamino-4-phenyl-4-trans-carbethoxy-Δ¹-cyclohexene which precipitates from the reaction mixture.

2. The process of claim 1 wherein oxalic acid is used and wherein, after the isomer mixture and acid are dissolved in the solvent, the reaction mixture is cooled to a temperature below about 10° C.

3. The process of claim 1 wherein fumaric acid is used and wherein, after the isomer mixture and acid are dissolved in the solvent, the reaction mixture is cooled to a temperature below about 10° C.

4. The process of claim 2 wherein the solvent is a lower molecular weight monohydric alcohol.

5. The process of claim 3 wherein the solvent is a lower molecular weight monohydric alcohol.

6. The process of claim 4 wherein the solvent is n-butyl alcohol.

7. The process of claim 4 wherein the solvent is isopropyl alcohol.

8. The process of claim 5 wherein the solvent is n-butyl alcohol.

9. The process of claim 5 wherein the solvent is isopropyl alcohol.

10. 3-Trans-dimethylamino-4-phenyl-4-trans-carbethoxy-Δ¹-cyclohexene oxalate.

11. 3-Trans-dimethylamino-4-phenyl-4-trans-carbethoxy-Δ¹-cyclohexene fumarate.

12. A process for the partial isomerization of 3-cis-dimethylamino-4-phenyl-4-cis-carbethoxy-Δ¹-cyclohexene which comprises heating 3-cis-dimethylamino-4-phenyl-4-cis-carbethoxy-Δ¹-cyclohexene with an organic acid selected from the group consisting of an aliphatic monocarboxylic acid, an aliphatic dicarboxylic acid, an aromatic monocarboxylic acid, an aromatic dicarboxylic acid and an anhydride of such acids at a temperature within the range of from about 60° C. to about 130° C. for a period of time sufficient to convert a portion of said 3-cis-dimethylamino-4-phenyl-4-cis-carbethoxy-Δ¹-cyclohexene to 3-trans-dimethylamino-4-phenyl-4-trans-carbethoxy-Δ¹-cyclohexene, there being present in said reaction mixture a ratio of from about 2 to 6 mols of said organic acid or anhydride thereof for each mol of said 3-cis-dimethylamino-4-phenyl-4-cis-carbethoxy-Δ¹-cyclohexene.

13. The process of claim 12 wherein the reaction is carried out with the said cis- isomer and said acid or anhydride dissolved in an organic solvent.

14. The process of claim 13 wherein the acid employed is fumaric acid.

15. The process of claim 13 wherein the acid employed is o-phthalic acid.

16. The process of claim 13 wherein the acid employed is acetic acid.

17. The process of claim 13 wherein the acid employed is itaconic acid.

18. The process of claim 13 wherein the acid employed is malonic acid.

19. The process of claim 13 wherein the acid employed is maleic acid.

20. The process of claim 13 wherein the acid employed is oxalic acid.

* * * * *